Jan. 9, 1934.  J. H. WAGENHORST  1,943,151
DEMOUNTABLE WHEEL
Filed Jan. 21, 1930
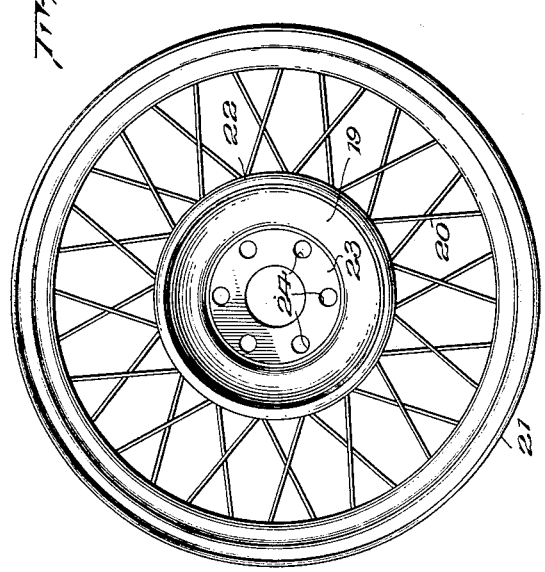
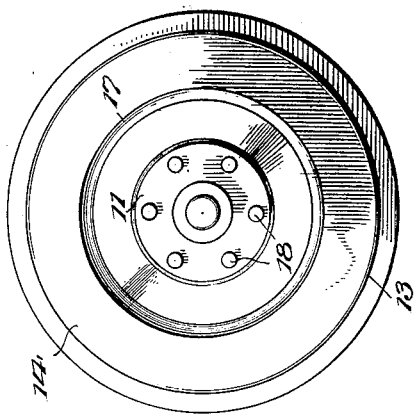
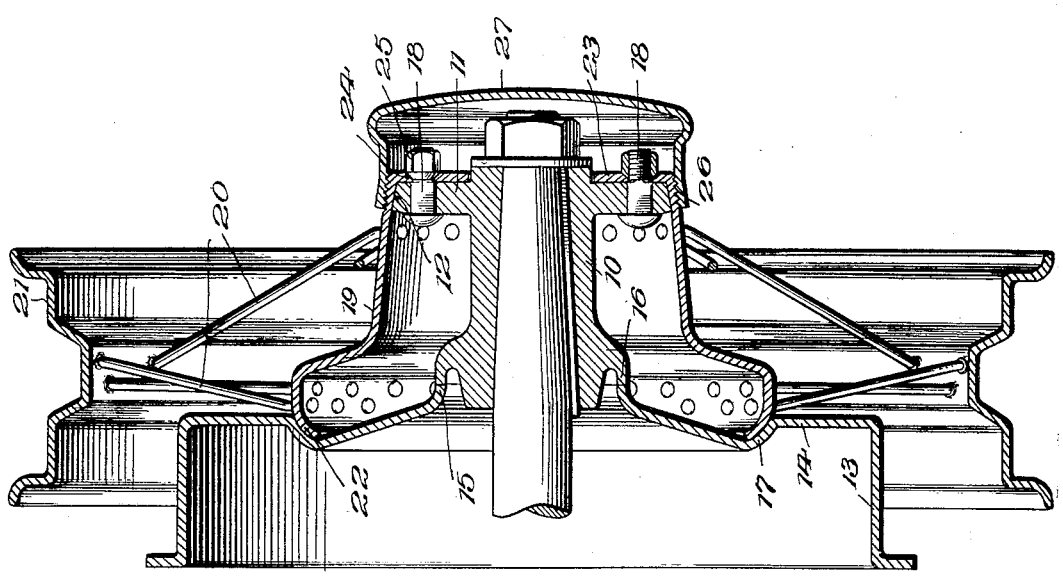
Inventor
James H. Wagenhorst,
By Church & Church
His Attorneys Patented Jan. 9, 1934

1,943,151

UNITED STATES PATENT OFFICE 1,943,151

DEMOUNTABLE WHEEL

James H. Wagenhorst, Detroit, Mich., assignor, by mesne assignments, to Kelsey-Hayes Wheel Company, Detroit, Mich., a corporation of Delaware Application January 21, 1930. Serial No. 422,384

1 Claim. (Cl. 301—6)

My invention relates to improvements in demountable wheels, and has to do, more particularly, with demountable wheels of the wire spoked type.

Automobile axles and braking mechanism are so constructed that, when wood wheels and hubs are mounted in the proper relation to the axle and braking mechanism, the treads of the wheels will be located a standard distance apart. In other words, the automobiles are constructed with wheels of standard gauge. The automobiles are so constructed that this standard gauge will be secured when wood wheels are mounted on the axle, and, when demountable wire spoked wheels are used in place of wood wheels, it has been found impossible to line up the treads of the wire wheels with the standard treads of the wood wheels. This is due to the fact that suspension spokes in a wire wheel must be disposed at a considerable angle to the normal plane of the wheel in order that the wheel be capable of withstanding side thrust as well as load strain. Since the rear end of the outer hub has been limited by the side wall of the brakedrum, it has been necessary to dispose the rim portion of the wheel outwardly thus displacing the tread of the wire wheel somewhat toward the outer end of the axle and increasing the gauge accordingly. This displacement is even greater in wire wheels having drop centers, since the spokes in such wheels are generally anchored, at their outer ends, to the dropped central portion of the rim. Such displacement is objectionable since the tread of the wheel is not properly located with respect to the wheel bearings nor with respect to the king pin of the steering apparatus, and the wheels will not track properly in the ruts of soft surfaced roads, making the vehicle difficult to steer and control, and subjecting the running gear to excessive strains.

The principal object of my invention is to provide an improved demountable wire wheel construction in which the vertical plane through the center of the wheel rim will be located in the same position with respect to the axle as would the vertical plane of the rim of a wood wheel mounted in its intended position upon such axle.

A further object of my invention is to provide means whereby a portion of the outer hub may be received within a recess in the side wall of the brakedrum, so that the spokes extending from the rear end of the hub to the rim may be brought closer to the side wall of the brakedrum and the requisite strength of the wheel structure obtained without a lateral displacement of the wheel tread.

A further object of my invention is to provide a demountable wheel structure, in which the outer or demountable hub is detachably seated on the inner hub and the brakedrum. In other words, to provide a construction in which the brakedrum contributes to the centering and seating of the removable outer hub. A further object of my invention is to provide a demountable wheel construction which shall be lighter, cheaper, and yet fully as strong as demountable wheel structures heretofore employed.

A further object of my invention is to provide a demountable wheel construction in which the hub of the demountable wheel is secured to the inner hub by fastening means wholly contained within and concealed by the hub cap, yet which are accessible and removable by a simple flat wrench, thus obviating the requirement of a special socket wrench having a long shank.

Further objects, and objects relating to details and economies of construction and operation will definitely appear from the detailed description to follow. In one instance, I accomplish the objects of my invention by the devices and means set forth in the following specification. My invention is clearly defined and pointed out in the appended claim. A structure constituting a preferred embodiment of my invention is illustrated in the accompanying drawing, forming part of this specification, in which Figure 1 is a vertical sectional view through a demountable wire wheel embodying my invention;

Fig. 2 is a view of the demountable portion of the wheel in rear elevation; and

Fig. 3 is a view of the inner hub and brakedrum in front elevation.

In the drawing, the same reference numerals refer to the same parts throughout the several views.

In general, my invention consists in providing an inner hub, to which a brakedrum is secured, and an outer hub, connected with a rim by wire spoke lacing, and detachably mounting the outer hub so that it is seated and supported on both the inner hub and the brakedrum, both these elements cooperating in the support and centering of the demountable outer hub. I propose, further, to provide the side wall of the brakedrum with an annular groove or recess which receives the rear end of the outer hub, so that the inner row of spokes may have the necessary inclination and yet bring the vertical plane through the center of the wheel rim in the usual relation to the side wall of the brakedrum and the axle. Since the rear end of the outer hub is received in this groove or recess in the side wall of the brakedrum, the hub ends of the inner row of spokes may come very close to the side wall of the brakedrum, whereas, in the usual construction, they must be displaced from the brakedrum, due to the end portion of the hub, which is interposed between the side wall of the brakedrum and the anchorages for these spokes.

Referring to the drawing, I have shown an embodiment of my invention comprising a hub 10, having a radial flange 11, the periphery of which is provided with a frusto-conical or beveled seating surface 12. The brakedrum 13 has a side wall 14 and a central forwardly-extending sleeve 15. The hub 10 is provided with a rearwardly extending flange 16 which is welded to the front edge of sleeve 15, thus securing the brakedrum to the hub. An annular groove or recess 17 is formed in the side wall of the brakedrum. The bolts 18 extend through the flange 11, with the heads of the bolts engaging the rear face of flange 11. These bolts may be non-circular in cross section, or otherwise secured to the flange 11, to prevent their turning therein.

The outer hub 19 is connected by wire spoke lacing 20, of the usual type, with a tire-carrying rim 21. The rear end of the outer hub has an inwardly curved flange 22 which will cooperate with the annular groove or recess 17 to support and center the rear end of the outer hub. The forward end of the outer hub is provided with a radially extending flange 23 which is adapted to engage the front face of the flange 11 on the inner hub. This flange 23 has a central opening therein, receiving the barrel of the hub 10, and also a series of countersunk holes 24, through which the bolts 18 extend. Nuts 25, provided with conical faces, are screwed on the forward ends of the bolts 18 and engage the countersunk walls of the holes 24. The outer hub is screw-threaded at 26, to receive the ornamental hub cap 27, which is screwed thereon, and encloses the forward ends of the hub and the securing bolts 18. The beveled seating surface 28 in the outer hub provides a surface cooperating with the beveled seating surface 12 on the periphery of hub flange 11.

It will be observed that the outer hub 19 is centered and supported by the cooperation of two sets of surfaces. The seating surface 28 engages the inclined surface 12 on the periphery of hub flange 11, to center the front end of the outer hub. The surface 22 at the rear end of the outer hub seats in the annular groove 17 formed in the side wall of the brakedrum to center and support the rear end of the outer hub. Of course, the spoke holes formed in the outer hub for the inner row of spokes must be spaced from the rear end of the hub sufficiently to provide enough metal to resist the tension on the spokes and anchor them securely. By providing, however, the annular recess 17 in the brakedrum, which receives the rear portion of the outer hub, the hub ends of the inner row of spokes 20 are brought very close to the side wall of the brakedrum, so that the usual tread relation of the wheel with respect to the axle may be maintained, although the spokes are given the proper inclination necessary for a strong wire-spoked structure. In Figure 1, the demountable wheel is shown mounted. To demount this wheel, the hub cap 27 is first unscrewed. Then the nuts 25 are unscrewed and removed, whereupon the entire removable wheel body, comprising the outer hub, spokes and rim, may be shifted laterally to demount the wheel.

I am aware that the particular construction here illustrated may be changed considerably without departing from the spirit of my invention, and, therefore, I claim my invention broadly, as indicated by the appended claim.

What I claim is:

A wire spoke wheel, comprising an inner hub member, a brake drum having a brake flange and a web secured to said inner hub member, said web having an annular depressed portion extending on the inboard side thereof, a rim member, an outer hub member having a tubular portion with its inboard end fitting in said depression and abutting said web and a radially inwardly extending portion at its outboard end, wire spokes connecting said rim member to the inboard and outboard ends of said outer hub member and threaded members detachably engaging said radially inwardly extending portion for detachably securing said outer hub member to said inner hub member with said outer hub member abutting said brake drum web.

JAMES H. WAGENHORST.